June 1, 1965 C. E. TREIBER, JR 3,186,467
OFF CENTER TRACTION GRIP DEVICE
Filed March 12, 1964
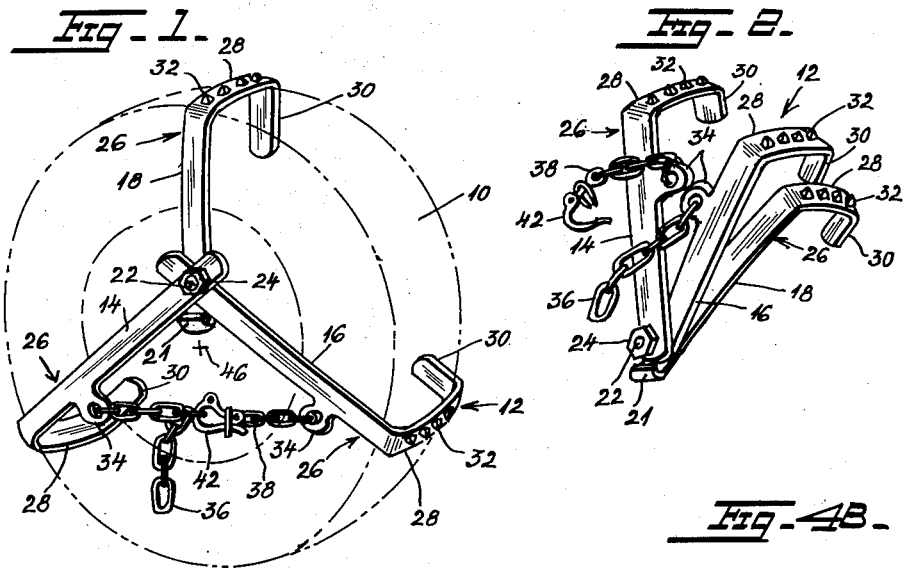
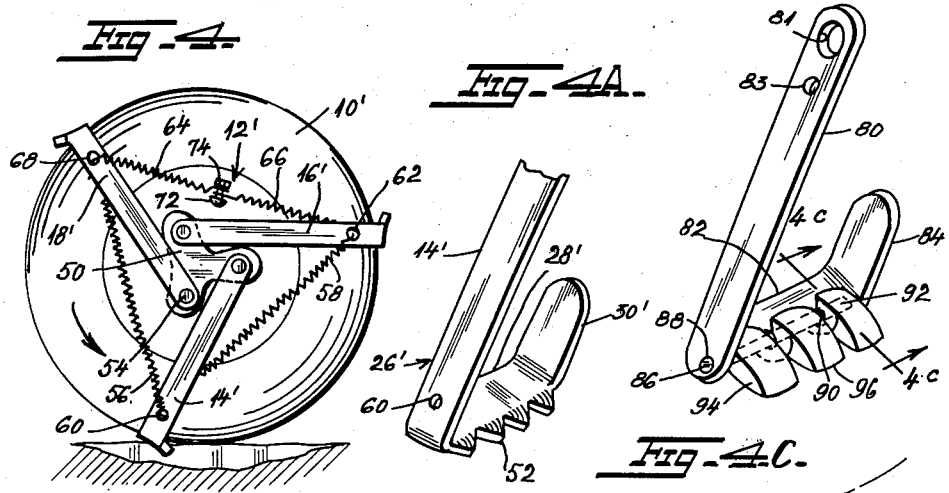
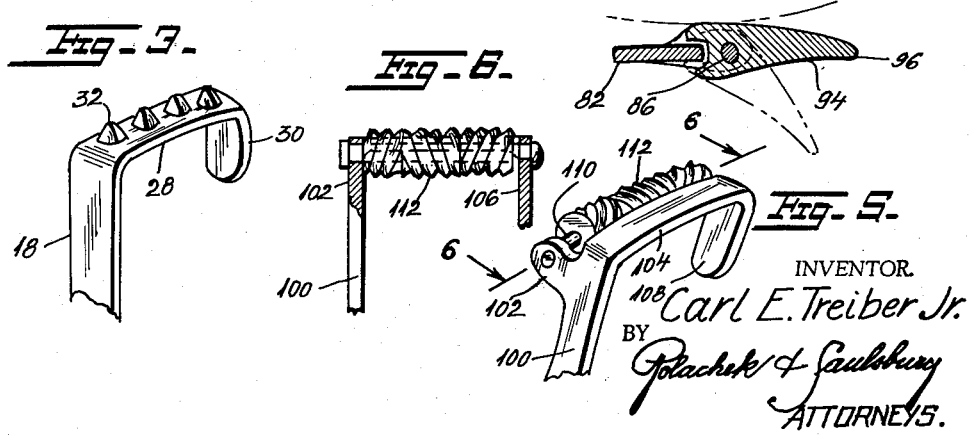
INVENTOR.
Carl E. Treiber Jr.
BY Polachek & Saulsbury
ATTORNEYS.

United States Patent Office 3,186,467
Patented June 1, 1965

3,186,467
OFF CENTER TRACTION GRIP DEVICE
Carl E. Treiber, Jr., Baldwin, N.Y.
(49 Spring Lane, Levittown, L.I., N.Y.)
Filed Mar. 12, 1964, Ser. No. 351,397
4 Claims. (Cl. 152—226)

This invention relates to traction devices and more particularly to anti-skid traction devices for the wheels of automotive vehicles.

A principal object of the present invention is to provide an anti-skid traction device for the driving wheels of automotive vehicles which is especially adapted for use on icy, snowy, muddy or other slippery road surfaces.

Another object of the invention is to provide an anti-skid traction device which may be readily applied to and removed from the wheel of a motor vehicle without the inconvenience and trouble usually associated with the application of tire chains or emergency chains.

A further object of the invention is to provide an anti-skid traction device having three arms pivotally connected at the ends thereof, each having a tire embracing hooked portion at the end thereof, one of said arms being shorter than the other two thereby bringing the pivot point off center from the center of the automobile wheel, whereby the clamping and gripping action of the hooked portions is increased.

Still another object of the invention is to provide an anti-skid traction device having three arms pivotally connected at the ends thereof, each having a tire embracing hooked portion at the end thereof, one of said arms being shorter than the other two thereby bringing the pivot point off center relative to the center of the automobile wheel, a flexible connection being provided between the longer arms intermediate the ends thereof for tangentially and radially drawing on the arms to clamp the arms to the wheel.

A still further object of the invention is to provide an anti-skid traction device which is so constructed that the wearing qualities of the road-gripping components are considerably better than devices now in common use.

Yet another object of the invention is to provide a device of this kind that is characterized by fewness of parts, is simple and rugged in construction and can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of an anti-skid traction device embodying one form of the invention mounted on the wheel of an automotive vehicle.

FIG. 2 is a perspective view of the anti-skid traction device removed from the wheel and in collapsed position.

FIG. 3 is an enlarged perspective view of the hooked end portion of one of the arms of the traction device.

FIG. 4 is a side elevational view of an anti-skid traction device embodying a modified form of the invention mounted on the wheel of an automotive vehicle, the wheel being shown over a rut in the road.

FIG. 4A is an enlarged perspective view of the hooked end portion of one of the arms of the traction device.

FIG. 4B is an enlarged perspective view of an arm with another modified form of hooked end portion.

FIG. 4C is a cross-sectional view taken on the line 4C—4C of FIG. 4B.

FIG. 5 is an enlarged perspective view of a fragment of an arm with a further modified form of hooked end portion.

FIG. 6 is a horizontal sectional view taken on the line 6—6 of FIG. 5.

Referring now in detail to the various views of the drawings, in FIG. 1 an anti-skid traction device made in accordance with one form of the present invention is shown mounted on the rim of a vehicle wheel tire 10 and is designated generally at 12. The traction device 12 consists of three arms 14, 16, 18 formed of flat bar material. The arm 18 is shorter than the other arms. The arms have one end juxtaposed relative to each other with aligned holes in said end, the holes being positioned closely spaced from the ends. The one end of arm 18, however, is bent outwardly as indicated at 21 and spans the space between the other arms 14 and 16 when expanded as seen in FIG. 1 for engagement with the opposing edges thereof and in order to keep the arm 18 from floating over the tire and against displacement thereupon. A headed pivot pin 22 extends through the aligned holes and is provided with a nut 24.

The other end of each arm terminates in a hook structure 26, the tread portion 28 of which extends across the rim and the extreme end portion 30 extends inwardly of the tire in firm contact therewith. Spaced spurs 32 are formed on the outer surface of the tread portion 28 for gripping the road. Intermediate the ends of the arms 14 and 16, perforated ears 34 are formed integrally with one long edge of the arms.

A tie device is connected between the long arms 14 and 16. This tie device consists of a short flexible chain 36 of the usual link type secured at one end to the ear 34 on arm 14, and a similar short chain 38 secured at one end to the ear 34 on arm 16. Chain 38 has a hook-shaped latch 42 pivoted to the other end for hooking over a link in chain 36. When the traction device 12 is mounted on the tire 10, the chain 38 may be fastened to chain 36 at any point therealong in order to cause the arms 14, 16, 18 to embrace the tread portion of the tire 10 and hold said arms in the desired angularly spaced relationship to each other.

In mounting the anti-skid traction device 12 upon the tire 10, it is not necessary to jack up the wheel and the device may be mounted upon the tire when the lower portion of the tire may be partially embedded in mud, sand or snow. It will thus be noted that by the position of the arms 14, 16, 18, in FIG. 1, the arms may be fastened in the desired 120° relationship with respect to each other without moving any of the arms to a lower position than is shown in FIG. 1. Hence, conceivably, the tire 10 may be embedded in mud, sand or snow up to the hooked structures of the arms. When the arms are thus fastened, the pivotal point of movement of the arms 14 and 16 as represented by the pivot pin 22 is remote or off center from the center of the tire 10 as shown by the cross 46 so that there is a radial and tangential pressure exerted upon the arms thereby tightly clamping the device on the tire.

In FIGS. 4 and 4A a modified form of anti-skid traction device 12' is illustrated. The device 12' consists of a generally triangular flat center hub plate 50 to which are connected three elongated arms 14', 16', 18', formed identically to one another from bar metal and of the same length. Each arm has a hook structure 26' at its outer end, the tread portion 28' of which extends across the rim of the tire 10 and the extreme end portion 30' extends inwardly of the tire in firm contact therewith. One edge of the tread portion 28' is formed with laterally extending teeth 52.

In order to provide for the pivotal connection of the arms 14', 16', 18' to the hub plate 50, short headed bolts 54 are employed. These extend through holes formed at the inner ends of the several arms and through aligned holes formed in the corners of the plate 50. Nuts (not shown) are provided on the smooth ends of the bolts. Connected between the several arms are two elongated springs 56, 58. The springs 56, 58 provide connector elements between adjacent arms, for the purpose of maintaining the hooked structures 26' in position upon the tire 10'. One end of spring 56 is hooked to the arm 14' through a hole 60 at the outer end thereof and the other end of spring 56 is hooked to a device (not shown) at the outer end of arm 18'. One end of spring 58 is hooked to the am 16' through a hole 62 at the outer end thereof and the other end of spring 58 is hooked to a device (not shown) at the outer end of arm 14'.

Cooperating with the springs 56 and 58, there is a connector or spreading member in the form of a two-part spring including a spring member 64 and a spring member 66. One end of spring member 64 is hooked to the arm 18' through a hole 68 at the outer end thereof, and one end of spring member 66 is hooked to the arm 16' through the hole 62 at the outer end thereof. The inner ends of the spring members are adjustably connected by means of a bolt 72 and nut 74 assembly.

In mounting the anti-skid device 12' upon the tire 10', the hooked structures of the arms 14', 16', 18' are applied in a tire-straddling position. The center hub plate 50 is disposed toward the center of the tire, and the arm 18' may be shifted upwardly about the wheel and the other arms will follow. The arms 14' and 16' are pushed around circumferentially until the springs are drawn taut. The spring members 64 and 66 are now connected adjustably by the bolt and nut assembly.

In FIGS. 4B and 4C a modified form of arm 80 having spaced holes 81 and 83 at one end and having an integral hook portion including a tread portion 82 and flanged extremity 84 at the other end is shown. A pivot pin 86 is journalled in a socket hole 88 in the bottom end of the arm and in a socket opening 90 in a shoulder 92 formed on the tread portion 82 adjacent the flanged extremity. A plurality of spaced lugs 94 are pivotally mounted on the pin 86 extending laterally of the tread portion, the lugs having curved bodies terminating in sharp end edges 96. The pivotal lugs afford additional traction to the tread portion.

Another modified form of arm 100 is shown in FIGS. 5 and 6 wherein an integral ear 102 is formed on the arm adjacent its juncture with the tread portion 104 and a similar ear 106 is formed on the extreme hook flange portion 108 in opposition of ear 102. A shaft 110 is journalled in the perforated ears 102 and 106 and fixed and sleeved over the shaft between the ears there is a cylindrical roller 112 with right-hand and left-hand screw threads formed on the periphery thereof. This roller affords additional traction to the tread portion 104.

In both forms of the anti-skid traction device shown and described, the device can readily be removed and the device requires no tools or levers, during installation or removal and is applied as well as removed without moving the vehicle or otherwise causing the tire to rotate.

Furthermore, rattling of the device or creep around the tire is fully prevented due to its being under tension when installed. The device will not fly off the wheel at any speed. Also, the device is always maintained upon the wheel in a proper state of balance, thus further aiding in efficient operation and preventing the occurrence of excessive strains at any given location upon the device.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. An anti-skid and traction device for a vehicle wheel comprising a plurality of arms having generally straight inner end portions pivotally connected to each other, said arms having hook-shaped outer end portions adapted to straddle the tire of a vehicle wheel, one of said arms being shorter than the other two arms, said arms swingable about an axis normal to the plane of the arms between operative and inoperative positions, the arms in their inoperative positions being extended in a common direction in side-by-side relation and in their operative positions extending angularly to one another, and a flexible element connected between the two long arms, said element being connected to the arms substantially at the juncture of the outer ends of the arms with the hook-shaped outer end portions thereof, said element adapted for adjustment as to its overall length.

2. An anti-skid and traction device for a vehicle wheel comprising a plurality of arms having generally straight inner end portions pivotally connected to each other, said arms having hook-shaped outer end portions adapted to straddle the tire of a vehicle wheel, one of said arms being shorter than the other two arms, said arms swingable about an axis normal to the plane of the arms between operative and inoperative positions, the arms in their inoperative positions being extended in a common direction in side-by-side relation and in their operative positions extending angularly to one another, the inner end portion of the shorter arm being outwardly bent and spanning the space between the other arms for engagement by the sides thereof to prevent displacement of the short arm upon the tire, and a flexible element connected between the two long arms, said element being connected to the arms substantially at the juncture of the outer ends of the arms with the hook-shaped outer end portions thereof, said element adapted for adjustment as to its overall length, said element consisting of two short link-type chains, one of said chains having a device for hooking over a link of the other chain.

3. An anti-skid and traction device for a vehicle wheel comprising a plurality of arms having generally straight inner end portions pivotally connected to each other, said arms having hook-shaped outer end portions adapted to straddle the tire of a vehicle wheel, one of said arms being shorter than the other two arms, said arms swingable about an axis normal to the plane of the arms between operative and inoperative positions, the arms in their inoperative positions being extended in a common direction in side-by-side relation and in their operative postions extending angularly to one another, and a flexible element connected between the two long arms, said element being connected to the arms substantially at the juncture of the outer ends of the arms with the hook-shaped outer end portions thereof, said element adapted for adjustment as to its overall length, said hook-shaped outer end portions each having a tread portion and a flange at the end thereof and spurs on the tread portion.

4. An anti-skid and traction device for a vehicle wheel comprising a plurality of arms having generally straight inner end portions pivotally connected to each other, said arms having hook-shaped outer end portions adapted to straddle the tire of a vehicle wheel, one of said arms being shorter than the other two arms, said arms swingable about an axis normal to the plane of the arms between operative and inoperative positions, the arms in their inoperative positions being extended in a common direction in side-by-side relation and in their operative positions extending angularly to one another, and a flexible element connected between the two long arms, said element being connected to the arms substantially at the juncture of the outer ends of the arms with the hook-shaped outer end portions thereof, said element adapted for adjustment as to its overall length, said hook-shaped outer end portions each having a tread portion and a flange at the end thereof, spurs on the tread portion, said elements consisting of two short link-type chains, one of said chains having a device at the end thereof for hooking over a link of the other chain.

References Cited by the Examiner
UNITED STATES PATENTS

| | | | |
|---|---|---|---|
| 2,440,632 | 4/48 | Hack | 152—225 |
| 2,453,611 | 11/48 | Zimmer | 152—225 |
| 2,458,522 | 1/49 | MacKay | 152—229 |
| 2,597,458 | 5/52 | Cummins | 152—225 |
| 2,693,838 | 11/54 | Dandurand et al. | 152—225 |
| 2,912,036 | 11/59 | Minutilla | 152—225 |
| 3,115,920 | 12/63 | Sand | 152—227 X |
| 3,122,192 | 2/64 | Seinell | 152—225 |

ARTHUR L. LA POINT, *Primary Examiner.*